United States Patent [19]
Davies et al.

[11] Patent Number: 5,751,793
[45] Date of Patent: May 12, 1998

[54] METHOD AND INSTRUCTIONS FOR VISUAL VOICE MESSAGING USER INTERFACE

[75] Inventors: Susan Davies, Boulder, Colo.; Gloria E. Davy, Phoenix, Ariz.

[73] Assignee: U S WEST Technologies, Inc., Boulder, Colo.

[21] Appl. No.: 680,893

[22] Filed: Jul. 16, 1996

Related U.S. Application Data

[63] Continuation of Ser. No. 404,010, Mar. 14, 1995, abandoned.

[51] Int. Cl.[6] .......................... H04M 1/64; H04M 1/56; H04M 15/06; H04M 3/42
[52] U.S. Cl. .................. 379/89; 379/127; 379/142; 379/201
[58] Field of Search .................. 379/67, 88, 89, 379/127, 142, 396, 201

[56] References Cited

U.S. PATENT DOCUMENTS

| | | | |
|---|---|---|---|
| 4,853,952 | 8/1989 | Jachmann et al. | 379/89 |
| 5,390,236 | 2/1995 | Klausner et al. | 379/67 |
| 5,467,385 | 11/1995 | Reuben et al. | 379/142 X |

FOREIGN PATENT DOCUMENTS

| | | | |
|---|---|---|---|
| 9427394 | 11/1994 | WIPO | 379/88 |

OTHER PUBLICATIONS

Bob NcNinch, "Screen-Based Telephony", Apr. 1990, pp. 34-38.

O'Mally, "Smart Phones", Jan. 1992, pp. 72-72.

*Primary Examiner*—Harry S. Hong
*Attorney, Agent, or Firm*—Timothy R. Schulte; Judson D. Cary

[57] ABSTRACT

An interface which displays indicia associated with a single voice mail message on a screen. The invention is used in a visual voice messaging system to allow a user to view indicia without scrolling to another screen. A user may thus sort messages which she desires to hear more quickly and easily.

19 Claims, 6 Drawing Sheets

5,751,793

METHOD AND INSTRUCTIONS FOR VISUAL VOICE MESSAGING USER INTERFACE

This is a continuation of application Ser. No. 08/404,010, filed Mar. 14, 1995, now abandoned.

BACKGROUND OF THE INVENTION

1. Field of the Invention

This invention relates to the field of telephony. More particularly, the invention relates to automated voice messaging systems. In still greater particularity, the invention relates to a user interface for a visual voice messaging system. By way of further characterization, but not by way of limitation thereto, the invention displays a single visual voice message on a screen along with various options related to that message.

2. Description of the Prior Art

Telephone subscribers have long desired to have a means to receive all calls made to them. As a result, answering services and the like have existed for a number of years. Historically, these answering services have focused on business as opposed to residential telephone users. While suited for their intended purpose, such answering services were also limited in that the caller could only leave a brief message to be written down by the answering service. Thus, the personal touch of hearing a "familiar" voice was lost. Similarly, the inflection or intonation indicating emotions such as anger, love, etc. cannot be communicated. In addition, the accuracy of the message was directly related to the conscientiousness of the answering service. Finally, because the message had to be left with another person, there was no privacy.

Subsequent to the establishment of answering services, answering machines were introduced. These machines allowed an incoming caller to record a message which could be left for the telephone subscriber. Such systems overcame the privacy limitations of the answering services. However, answering machines were subject to equipment breakdown and were expensive, requiring a machine for each telephone number. In a business setting, this could be prohibitively expensive. Finally, in either a business or residential setting, aesthetics require that the answering machine be hidden or at least partially concealed. Problems with equipment failure and subsequent repair as well as cost limited the usefulness of these answering machines. In addition, these answering machines do not answer when the telephone line is busy and thus the caller cannot leave a message. Also, these machines are limited in that the owner/user cannot selectively erase and save messages. Thus, while suited for their intended purpose, such machines were limited by the above factors.

In recent years, voice messaging systems have become available. Such systems have the same advantages of an answering machine, but do not require a separate piece of equipment. The equipment to provide the voice messaging system is owned by the provider of the service. Both the subscriber to the service and all callers making calls to that subscriber may leave messages on the system. The subscriber may access the system from remote locations, which in the case of answering machines, is not always possible. In addition, voice messaging systems allow the caller to leave a message when the called line is busy and allow the user to selectively save or erase messages. Thus, voice messaging systems allow a user to enjoy the advantages of an answering machine without the stated limitations and associated disadvantages of acquiring, repairing and otherwise maintaining an answering machine. In addition, more options and features are available on voice messaging systems. Because of this, voice messaging systems have become popular.

One limitation of the voice messaging systems has been that many of them are complicated to operate for the subscriber and thus, may helpful options are not utilized. That is, the user interacts with the voice messaging system through a touch-tone phone and, if the interaction is difficult, many subscribers will not be able to interact effectively. Subscribers encountering difficulty will either not subscribe to the system initially, or, if they do subscribe, they will discontinue the service. Thus, it is critical that a voice messaging system be easy to understand and use to allow a user to acquire all of the information desired. While being easy to use, the system must also be sufficiently sophisticated such that the subscriber can obtain all of the necessary message information and utilize available customization options to make the system useful.

Over the last few years Caller Identification Systems have been developed. These Caller ID services allow the called party to view the name and or telephone number of the party initiating the call. Screenphones or displays attached to conventional phones are used to provide the name/number information. In an effort to make voice messaging more "user friendly", visual voice messaging systems have been developed. These systems utilize customer premises equipment (CPE) such as screenphones (e.g. caller ID) to display information associated with the voice mail message as well displaying the functions which are used to manipulate (save, erase etc.) a message. By displaying these functions visually, the use of these functions is facilitated and the user is not required to memorize the function key location on a DTMF (Dual Tone Multi-Frequency) keypad or to consult a user guide which may be lost or unavailable.

Existing visual voice messaging systems, while suited for their intended purpose, are limited in that these systems display the entire list of messages on the screen requiring relatively large screens. For example, screen sizes of 18 lines high and 40 characters in width are often used. Some systems may even utilize television screens. However, many manufacturers and consumers desire to utilize smaller screen sizes such as 8 lines by 20 characters. If the smaller screen is used, the entire space on the screen would occupied by this list of messages. There would be little or no space for information about each message such as date, time etc. In order to obtain this information a user would be required to scroll to different screens and then scroll back to the first screen for the next message. Because this information would not be readily available to the user, the user may experience difficulty and delay in trying to sort her messages based upon such information. Thus, for screen phones utilizing these smaller screens it would be desirable to have an interface which allows the user to easily obtain information on each message without the requirement of scrolling to additional screens.

SUMMARY OF THE INVENTION

The invention is a user interface between a user and customer premises equipment (CPE) such as a screenphone. The interface includes a message display format as well as a method and instructions for performing various operations or functions on the messages. The messages are displayed one at a time on the screen including all of the indicia associated with that message such as the date, time of the message as well as the name and phone number of the party leaving the message. By displaying this information along with the message in a small screen environment the user is able to easily and quickly sort messages without being required to scroll to additional screens to obtain the information.

The interface includes soft keys adjacent to the screen display with various functions associated with the keys. Because the messages are displayed one to a screen these functions may be used to quickly and easily sort through the message inventory thus avoiding the confusion associated with viewing a number of messages on the same screen. This, in effect, allows the user to randomly access and listen to messages by viewing the indicia associated with each message and, based upon that criteria, to save, replay or erase the message without the requirement of listening to the entire message.

DESCRIPTION OF THE PREFERRED EMBODIMENT

Figure 1:
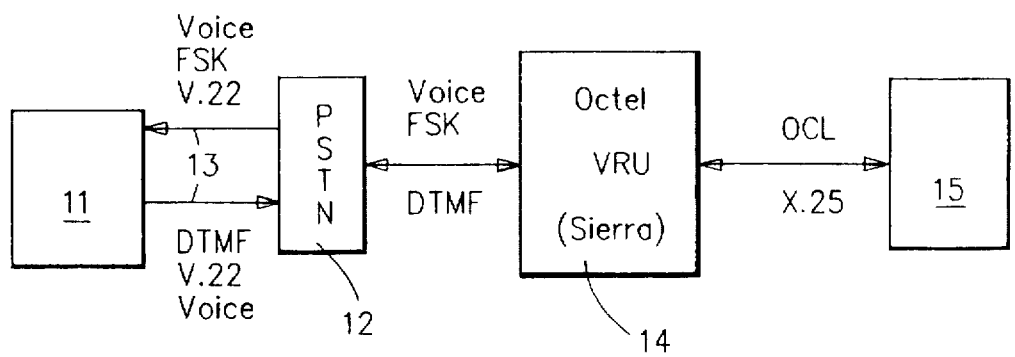
FIG. 1 illustrates a visual voice messaging system architecture.

Reference is now made to the drawing figures wherein like reference numerals denote like elements throughout each of the various figures. Referring to FIG. 1, a system architecture is shown which includes customer premises equipment (CPE) such as screen phone 11 which may, for example, be a Northern Telecom ADSI POWER TOUCH 350 Phone connected to the public switched network 12 via standard Analog Display Services Interface (ADSI) protocol such as V.22 interfaces. A voice response unit (VRU) 14 such as the Sierra available from Octel Corp. is also connected to network 12 such that phone 11 may interact with VRU 14. VRU 14 interfaces with a computer 15 upon which resides voice and data applications software such as BETEX available from Vicorp Interactive Systems Inc. VRU 14 and phone 11 communicate via the ADSI protocol which enables the sending of text screens and voice intermixed to the CPE. VRU 14 will also provide voice prompts to enhance the screen displays and assist the user.

Figure 2:
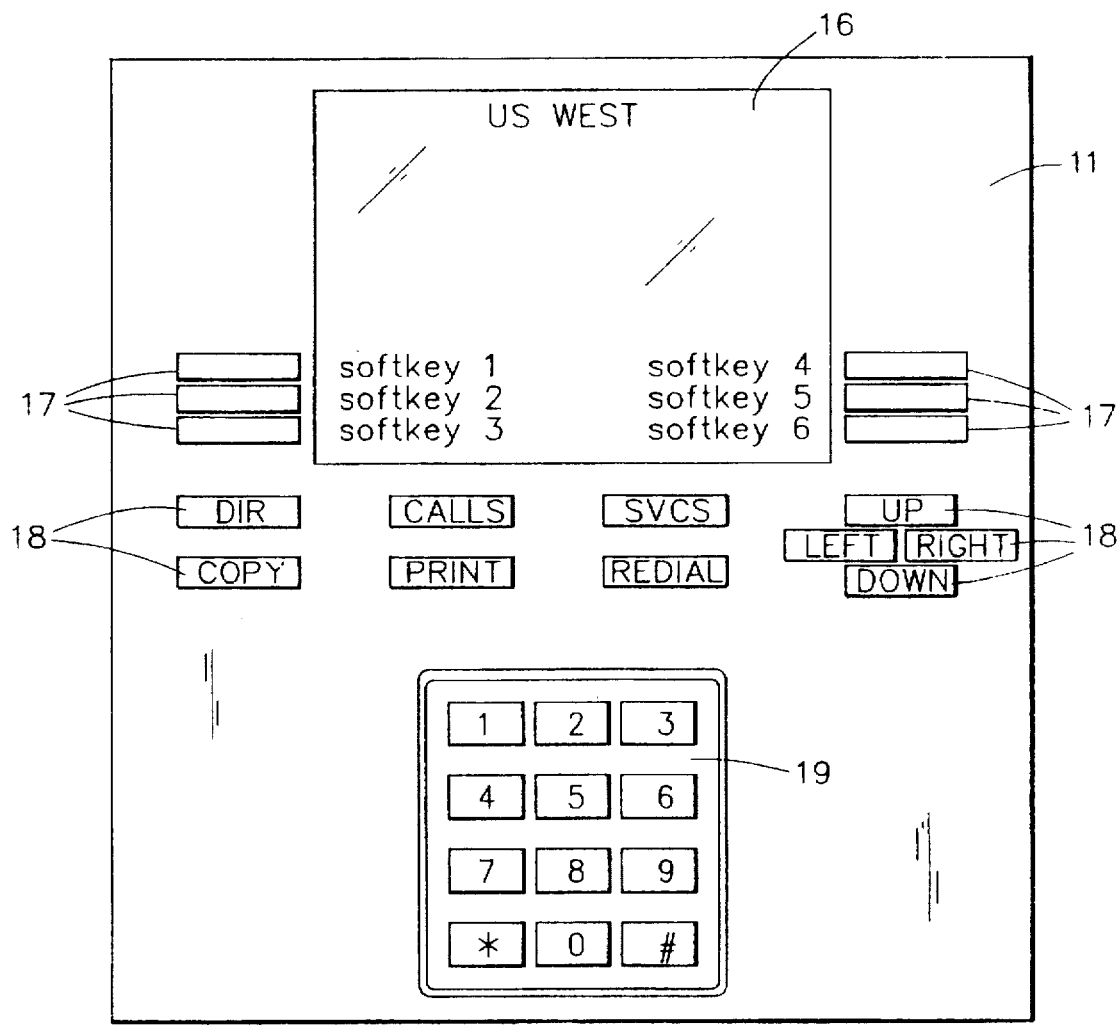
FIG. 2 illustrates the display screen and hard and soft keys on a screenphone.

Referring to FIG. 2, the face of phone 11 is shown in greater detail. Phone 11 includes a display screen 16, a plurality of soft keys 17, one or more hard keys 18 and the conventional DTMF (Dual Tone Multi-Frequency) keys 19 in addition to a handset (not shown) and a speaker (not shown). The screen size on the phone 11 is preferably no larger than 20 characters wide by 8 lines high. Lines 6, 7, and 8 are reserved for soft key labels. The soft keys 17 may be pressed to access the functions displayed on the display screen 16 adjacent to a particular soft key. The hard keys may be pressed to enable the functions permanently indicated on the keys themselves. The DTMF keys are pressed in a conventional manner to interact with the network 12 and the VRU 14 as is known in the art.

Figure 3:
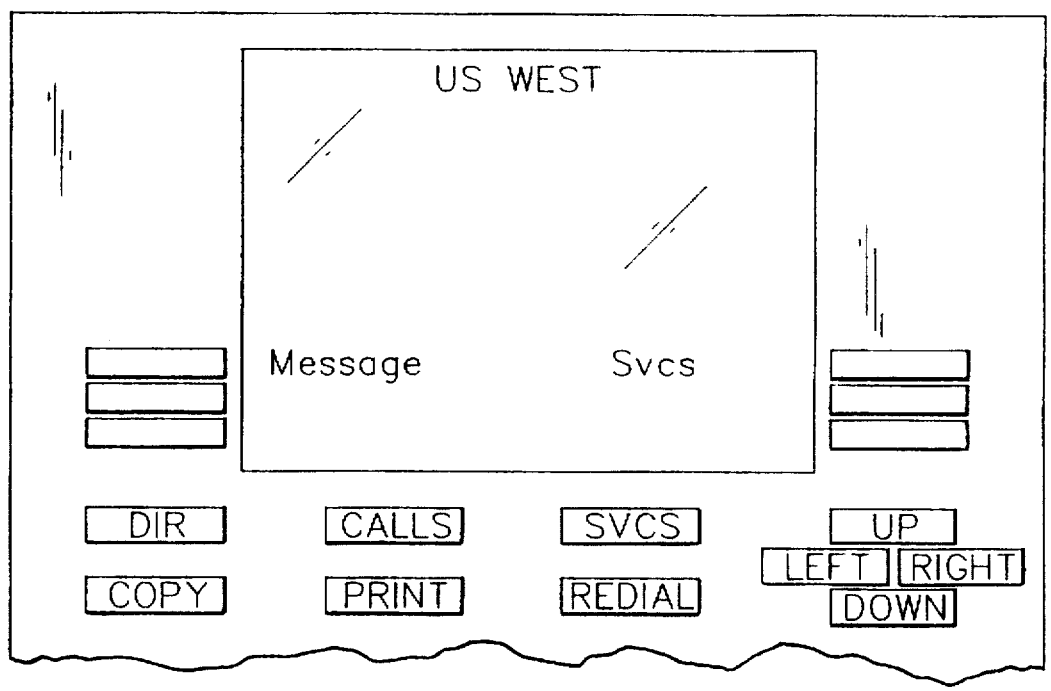
FIG. 3 illustrates a display screen as first viewed by a user.

Referring to FIG. 3, display screen 16 is shown as the VVMS System is first presented to a user. The user initiates the process by pressing the soft key 17 adjacent the "Message" indication on the screen. Pressing the "Message" soft key will dial the rapid retrieval number for the VRU. The user is preferably asked to input a security code to access the voice mailbox although this step is not required as automatic caller identification or similar means may be used to identify the calling party. If the party is calling from a telephone other than their own they may be asked to enter their telephone number and/or security code.

Figure 4:
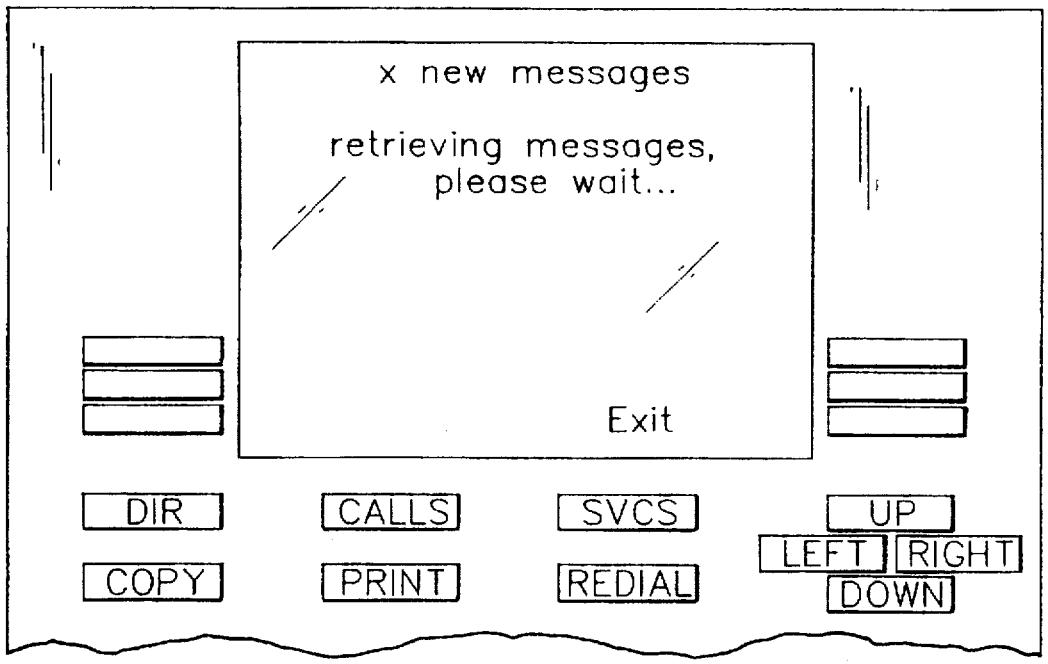
FIG. 4 illustrates a display screen indicating the number of new messages.
Figure 5:
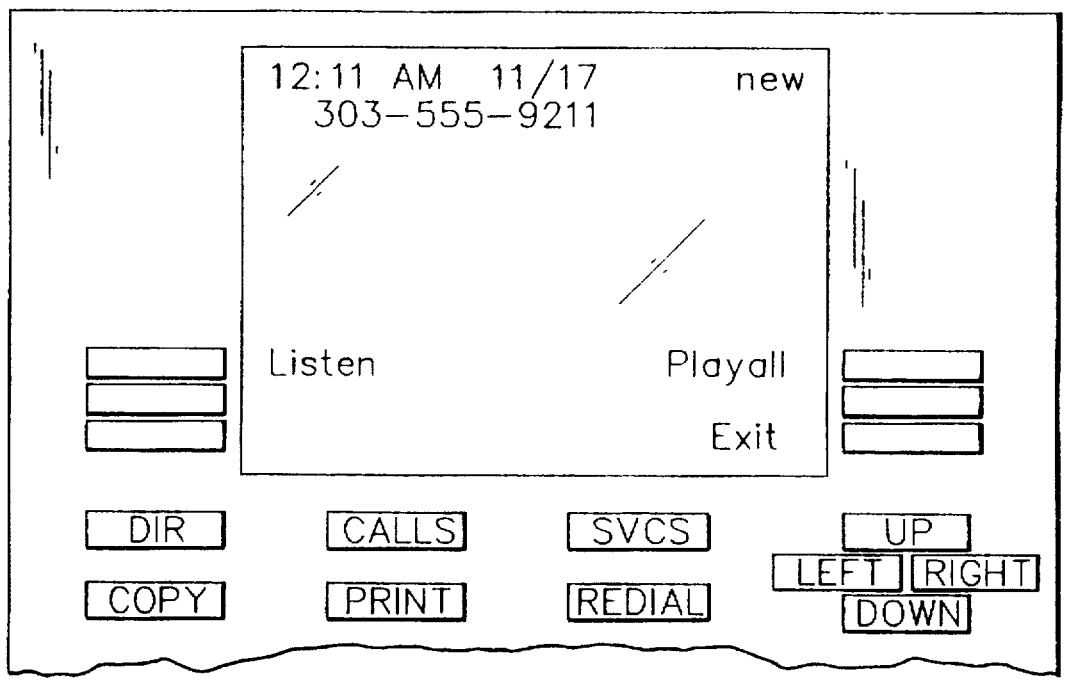
FIG. 5 illustrates a display screen showing indicia associated with one message.

Referring to FIG. 4, once the user has accessed the VVMS system, then the screen phone 11 will display a screen indicating the number of new messages. The screen will also advise the user that the messages are being retrieved. Referring to FIG. 5, the first "new" message is displayed including indicia as to the status ("new"), the date and time the message was left and the telephone number of the calling party if available through means such as caller identification. If the message is "new" as in FIG. 5, then the soft key options are "listen", "playall", and "exit". By pressing the appropriate soft key, the user may thus listen to the message displayed on the screen, listen to all "new" messages, or exit the system. Indicia for only one message is displayed on the screen at any time. Unlike other visual voice message systems which display a list of all messages, the present invention allows the user to see all indicia for each message without scrolling to another screen. Because the screen size is limited to a certain number of lines and characters, indicia as to date and time the message was left and phone number of the calling party would not be available on the screen if all messages in the system were displayed. In such systems the user is required to scroll off the screen to view date and time information. In addition to the indicia as to date time and telephone number additional indicia such as the name of the calling party or other information may be included if available. Of course the screen size could also be reduced in the present invention while including the present indicia as to date, time and phone number.

Referring again to FIG. 5, if the user desires to see the next message which is either "new" "heard" or "saved", she presses one of the hard keys 18 such as the "up" or "down" keys in FIG. 3. Of course, the up and down function could also be implemented in soft keys 17. The up and down function allows the user to view the previous or next message queued in the system along with the indicia associated therewith. By allowing the user to scroll through the messages and view the indicia associated therewith the user may make decisions based upon the indicia very quickly. In effect the user is enabled to randomly sort the messages based upon her own criteria. The messages are preferably sorted by the system in a first in, first out, order but it should be expressly understood that this is a design choice which may be varied depending upon the desires of the system architect. Because the user is not required to scroll to another screen to obtain information about the call the user may rapidly make a determination as to his desire to listen to the message based upon the displayed indicia. For example, the user may desire to listen to all messages left during a certain time of day, i.e., 2-3 PM, or on a certain date. The user may also desire to sort through the messages for a message left from a certain telephone number where calling party information is available. The requirement of other VVMS systems to scroll through a list of messages is avoided. In those systems, if 10 messages were in queue, the system would likely display messages 1-5. If the user scrolls down then messages 2-6 would be displayed. If the user wanted to view indicia relating to any message then the user would scroll to another screen to view those indicia. With the present invention the user only need scroll up or down from one screen to the next to view a previous or subsequent message including all indicia associated with a particular message.

Figure 6:
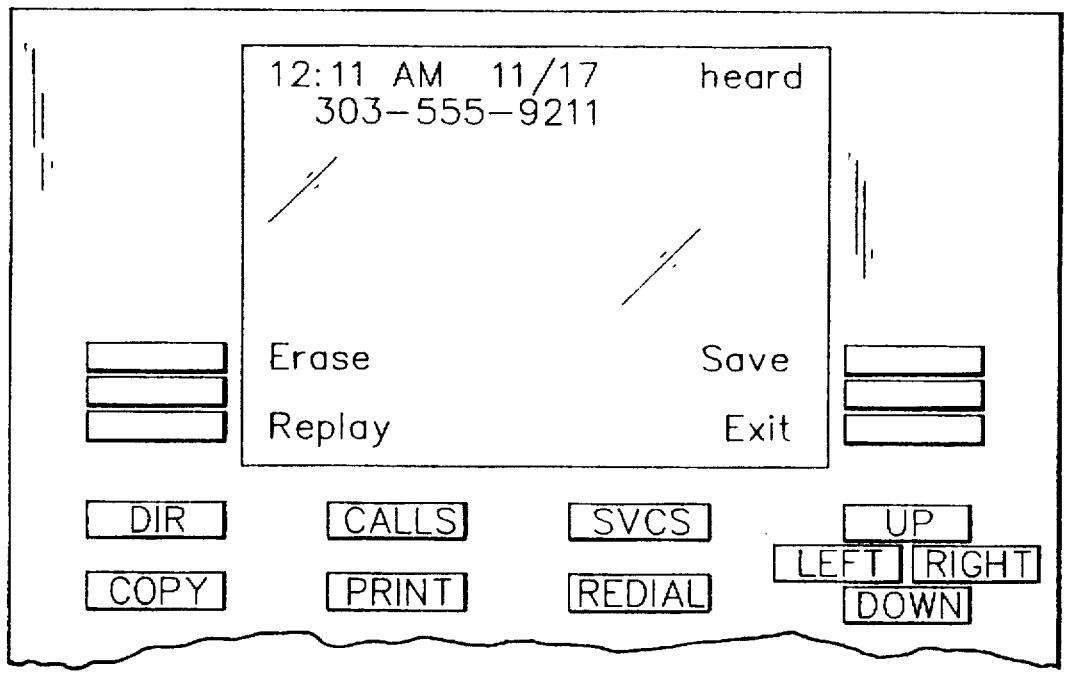
FIG. 6 illustrates a display screen associated with a "heard" message.
Figure 7:
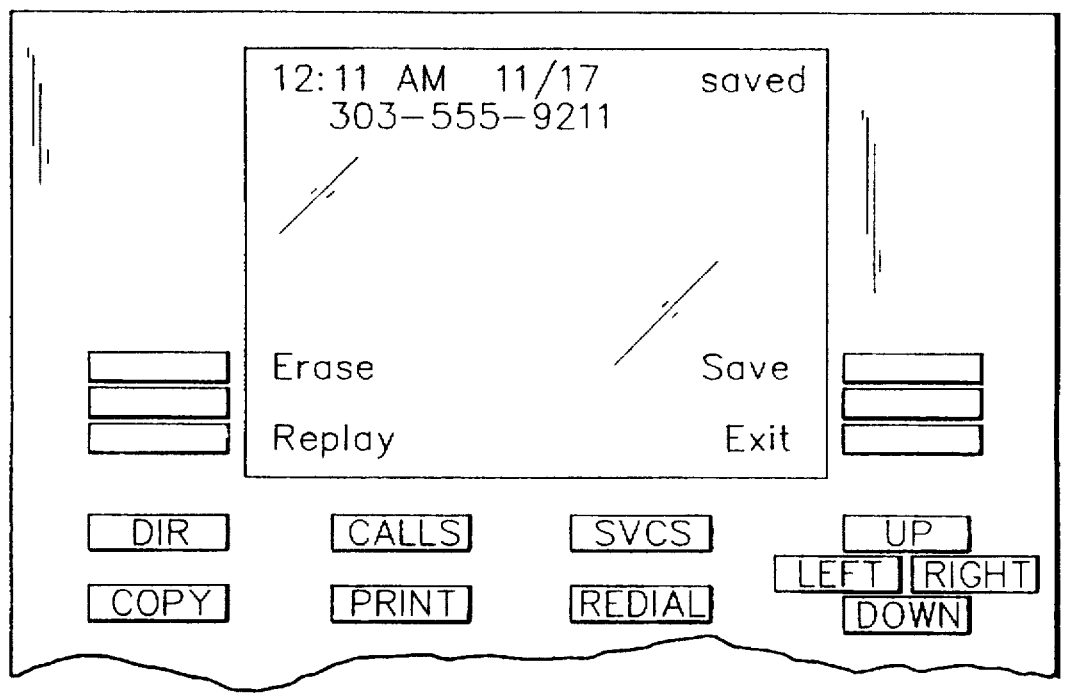
FIG. 7 illustrates a display screen associated with a "saved" message.

Referring to FIG. 6, a screen associated with a "heard" message is shown. A message is considered "heard" if at least a portion of it has been heard. If a message is "heard" then the user will be given the soft key options shown in FIG. 6. The message may thus be replayed, erased, or saved or the user may exit the system. There is no requirement that the user actually listen to the entire message before erasing or saving the message. Once playback has begun the user may select these options. This allows the user to more rapidly control the messages without listening to the entire message. Similarly, for "saved" messages as shown in FIG. 7, the same options are available as for "heard" messages.

As can be appreciated from the above description, the labels adjacent each soft key 17 may be varied depending upon the type of message being displayed. The "playall" soft key is enabled on "new" messages and will play all of them sequentially without erasing after each message is heard. At the end of that playback all these messages will be marked as "heard". After a message is listened to, indicia representing the message type will be updated depending upon the action taken during review. When a message is "erased" it is removed from the log. The "#" DTMF key 19 may also be used to scroll to the next page without using the scroll keys. A "new" message must be at least partially listened to before it can be erased or saved. The message status of each individual message is updated immediately upon making a change in the status. For "saved" messages the user is not required to resave them as this is done automatically. The "listen", "replay", "erase", and "save" functions may also be selected by pressing appropriate DTMF keys 19.

Figure 8:
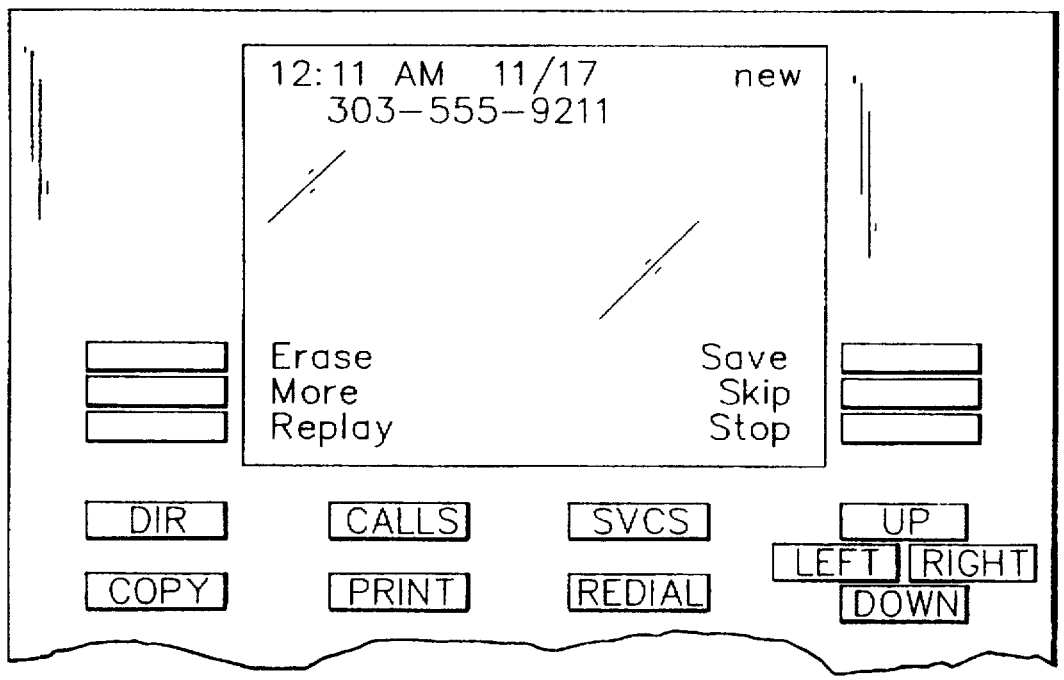
FIG. 8 illustrates a display screen shown after the user has pressed "listen"

Referring to FIG. 5, if a user presses "listen" for a "new" message the system displays the screen shown in FIG. 8. Similarly, if a user presses "replay" for a "saved" or "heard" message, the system takes her to the screen shown in FIG. 8. Referring to FIG. 8, the user is given a number of options during playback of a message. One novel aspect of the current invention is that the user may press "erase" or "save" during playback of the message without being required to either listen to or fast forward to the end of the message. As with previously disclosed features, this allows faster and easier use of the system. Many users of standard voice messaging systems are relatively unsophisticated in their use and are unaware of the options of fast forwarding etc. The VVMS System displays the options visually to assist the user. The present invention thus facilitates the use of the system.

If the user presses "erase" then the message is removed from the message log. Once a message has been heard at least in part the "new" designation is removed and the message is listed a "heard" unless it is "saved". During playback the user may also press "replay" at which time the message is again played from the beginning. If "skip" is selected the playback is stopped and the message becomes "heard". If "stop" is selected then playback is stopped and the system returns to the screen shown in FIG. 5, 6, or 7 depending upon message status.

Figure 9:
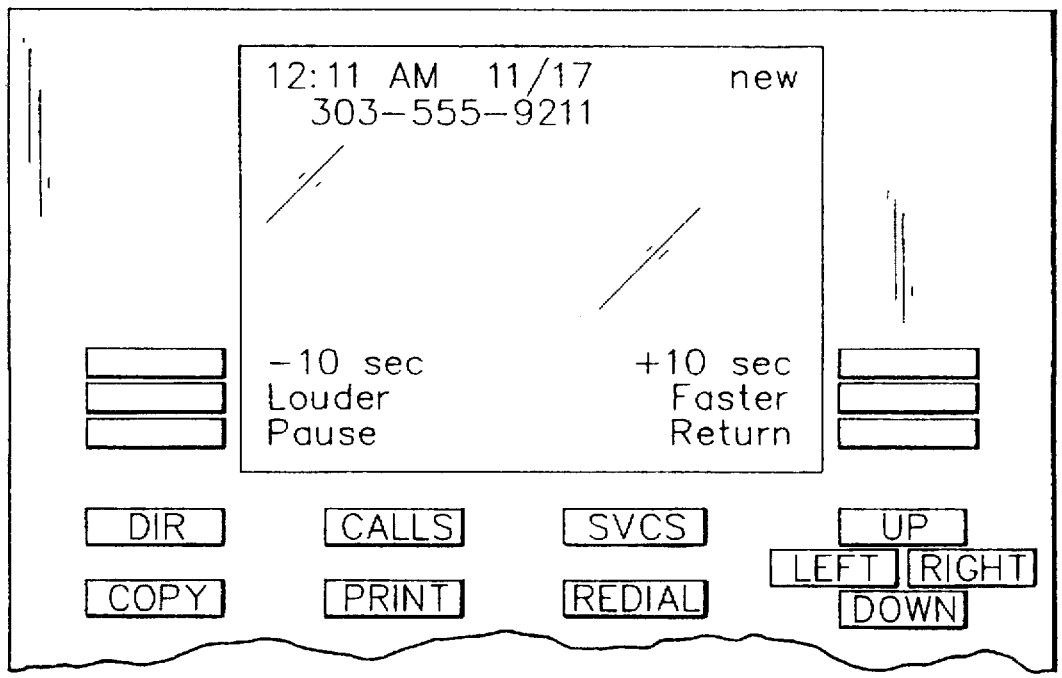
FIG. 9 illustrates a display screen showing additional soft key options associated with playback.

Referring again to FIG. 8, if the user presses "more" during playback of a "new", "heard" or "saved" message, the system displays the soft key options shown in FIG. 9. By pressing the appropriate key the user may vary the loudness or speed or even pause the message. These options are available on conventional voice messaging systems such as the Aspen Sierra sold by the Octel Corp. However, these options are only accessed through the DTMF keys and unsophisticated users are not aware of or do not employ these features. It should be noted that the present VVMS system utilizes these same DTMF options in addition to the soft key options displayed on the display screen in FIG. 9. Sophisticated users may desire to continue to use the DTMF keys to control these functions. The "return" soft key 17 in FIG. 9 returns the user to the previous screen (FIG. 8). When one of soft keys 17 other than "return" is pressed the screen display does not change until the end of the message. When the message has finished playing, the screen in FIG. 8 is displayed and the user must then take action on that message before proceeding to the next message.

Figure 10:
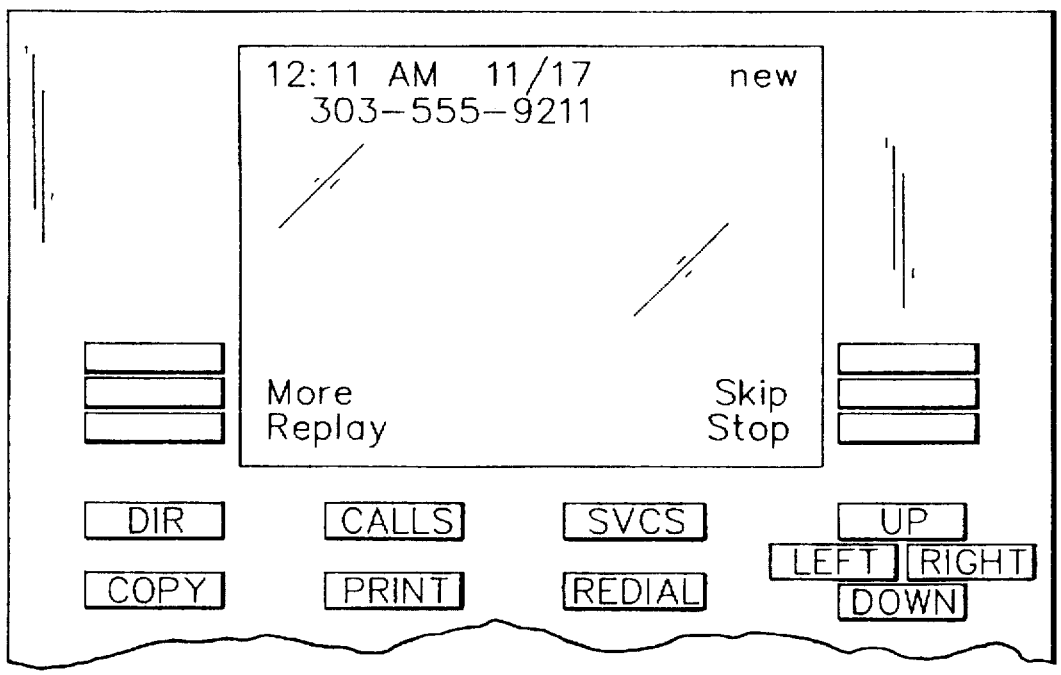
FIG. 10 illustrates a display screen after the user has selected "playall"

Referring again to FIG. 5, if a user presses the "playall" soft key 17, then the screen shown in FIG. 10 is displayed. This screen is the same as in FIG. 8 except that the "save" and "erase" soft keys are not available. If the "playall" key is pressed the soft key options shown on the screen in FIG. 10 will be displayed while each "new" message is played. Messages cannot be erased or saved during "playall" playback. The "more" soft key will display the soft key options shown in FIG. 9. If the "stop" soft key is pressed the playback is stopped and the screen in FIG. 5 is displayed with the current message. This message status is changed to "heard". If the "replay" soft key is pressed the message is replayed from the beginning. If the "skip" soft key is selected then the playback is stopped, the status is changed to "heard" and the next "new" message is played. After the last "new" message is played the screen shown in FIG. 11 will be displayed.

Figure 11:
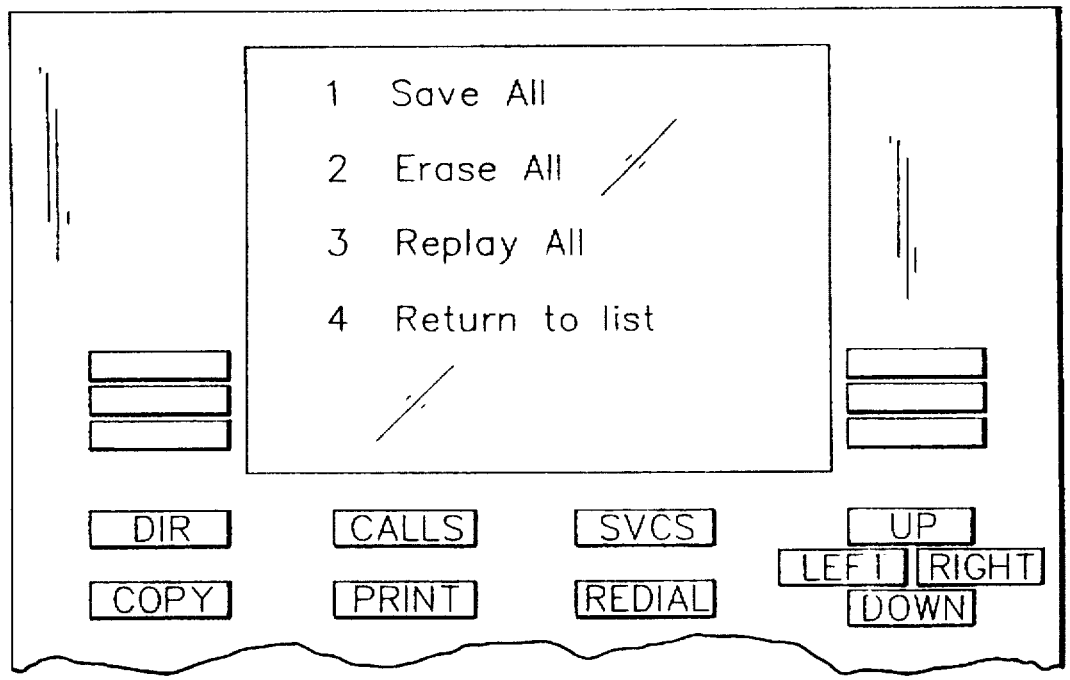
FIG. 11 illustrates a display screen after playback of all messages selected by "playall".

After playback of all messages during "playall" the screen shown in FIG. 11 is displayed. The user is instructed to press a DTMF key corresponding to the desired function. All messages will be treated as instructed by the user or if "return to list" is selected then the screen in FIG. 5 will be displayed.

While the invention has been disclosed with respect to a preferred embodiment thereof it should not be so limited as changes and modifications may be made which are within the full intended scope of the invention as defined by the attached claims. For example while hard keys 18 include "up", "down", "left" or "right" keys for scrolling it can be appreciated that other designations such as "next" may be used without departing from the claimed invention. Soft keys 17 could also be used to implement some or all of these functions.

What is claimed is:

1. A customer premises equipment (CPE) used in conjunction with a public switched telephone network visual voice messaging system, said CPE comprising:

a display screen;

a plurality of soft key buttons associated with said display screen;

a plurality of function labels associated with the soft keys;

a DTMF keypad; and message identification and message status displayed on said display screen, said message identification obtained via the public switched telephone network wherein said function labels are determined as a function of the message status.

2. CPE according to claim 1 further including hard key buttons to allow the user to view message identification and message status associated with a previous or subsequent message.

3. CPE according to claim 1 further including soft key buttons to allow the user to view message identification and message status associated with a previous or subsequent message.

4. In a public switched telephone network having caller identification, a system for interfacing between a subscriber and a Visual Voice Messaging System (VVMS), said system comprising:

a public switched telephone network (PSTN);

operatively coupled to said PSTN, a VVMS for accepting and storing one or more messages and determining a message status associated with each message, said VVMS comprising a screen phone including a display screen, soft keys adjacent said display screen, one or more hard keys operatively associated with said display screen, a DTMF keypad, and function labels associated with said soft keys wherein said labels are determined as a function of the message status;

operatively coupled to said PSTN; a caller identification system for providing message identification associated with each message;

wherein said message identification and said message status associated with a single message are displayed on said display screen.

5. A system according to claim 4 wherein said message status includes:

an indication whether said message is "new", "heard", or "saved".

6. A system according to claim 5 wherein a message status is "saved" and said function labels including an "erase" function displayed adjacent a first one of said soft keys, a "replay" function displayed adjacent a second one of said soft keys and a "save" function displayed adjacent a third one of said soft keys.

7. A system according to claim 4 wherein said message identification includes a telephone number identifying a calling party who left the message.

8. A system according to claim 4 wherein said message identification includes a calling party's name.

9. A system according to claim 4 wherein a message status is "new" and said function labels including: a "listen" function displayed adjacent a first one of said soft keys; a "playall" function displayed adjacent a second one of said soft keys; and an "exit" function displayed adjacent a third one of said soft keys.

10. A system according to claim 4 wherein a message status is "heard" and said function labels including an "erase" function displayed adjacent a first one of said soft keys, a "replay" function displayed adjacent a second one of said soft keys and a "save" function displayed adjacent a third one of said soft keys.

11. A system according to claim 4 wherein said hard keys include:

a key to allow the user to view the message identification and message status associated with a previous message; and a key to allow the user to view the message identification and message status associated with a subsequent message.

12. A system according to claim 4 wherein said soft keys include:

a key to allow a user to view the message identification and message status associated with a previous message; and a key to allow a user to view the message identification and message status associated with a subsequent message.

13. The system of claim 4 wherein the message identification is selected from the group consisting of caller name, caller phone number, date of call, and time of call.

14. In a public switched telephone network comprising caller identification and a Visual Voice Messaging System (VVMS), said VVMS comprising a screen phone including a display screen, soft keys adjacent said display screen, and a DTMF keypad, a method for interfacing between a subscriber and said VVMS, the method comprising the steps of:

receiving one or more messages to the subscriber via the public switched telephone network (PSTN);

determining, via the PSTN caller identification, message identification associated with each message;

determining a message status associated with each message;

displaying function labels associated with said soft keys on the display screen wherein the function labels are determined as a function of said message status:

having the subscriber interact with the VVMS via said soft keys; and displaying said message identification and said message status associated with a single message on said display screen.

15. A method according to claim 14 further comprising the steps of:

playing back a message; and providing the capability to erase or save said message prior to the completion of said message playback.

16. A method according to claim 14 further including the step of pressing one or more hard keys operatively associated with said display screen, to view a single previous or next message and associated message identification and message status.

17. A method according to claim 14 further including the step of pressing one of said soft keys to view a single previous or next message and associated message identification and message status.

18. The method of claim 14 wherein the message identification is selected from the group consisting of caller name, caller phone number, date of call, and time of call.

19. The method of claim 14 wherein the message status is selected from the group consisting of new, heard, and saved.

* * * * *